May 12, 1953 | E. F. MacNICHOL, JR | 2,638,548

GATED OSCILLATOR CIRCUIT

Filed Sept. 18, 1945

INVENTOR
EDWARD F. MACNICHOL JR.

BY Ralph L. Chappell
ATTORNEY

Patented May 12, 1953 2,638,548

UNITED STATES PATENT OFFICE 2,638,548

GATED OSCILLATOR CIRCUIT

Edward F. MacNichol, Jr., South Hamilton, Mass., assignor, by mesne assignments, to the United States of America as represented by the Secretary of the Navy Application September 18, 1945, Serial No. 617,137

6 Claims. (Cl. 250—36)

This invention relates to radio circuits, and more particularly to circuits for producing a periodically discontinuous train of oscillations.

The primary object of my invention is to generally improve circuits of the character described.

A more particular object is to improve the circuit disclosed in a copending application of Francis Gaffney, Serial No. 608,591, filed August 2, 1945. In the circuit of the aforesaid application it is desired to obtain a timing wave or marker wave for range marking purposes, and to this end an oscillator is gated by means of a switch tube to which a negative gate is applied. The oscillator tube is biased by means of an RC circuit adjusted to provide appropriate grid bias. This is satisfactory at long ranges where the first few marker pulses are not needed, but is unsatisfactory at close ranges because several cycles are required to build up the bias potential on the RC circuit. A further object of the present invention is to provide a gated circuit which is satisfactory for range marking purposes at close ranges.

Still another object of the present invention is to provide a gated ringing circuit having good frequency and phase stability despite changes of the vacuum tube, so that replacement of the tube will not upset the accuracy of the range mark indications.

To accomplish the foregoing objects, and others which will hereinafter appear, my invention resides in the circuit elements and their relation one to another as are hereafter described in the specification and sought to be defined in the claims. The specification is accompanied by a drawing in which:

Figure 2:
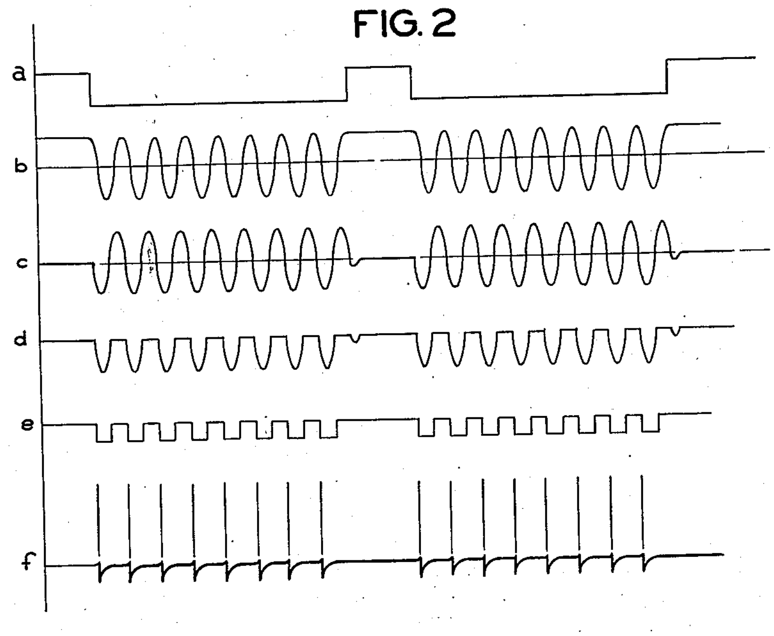
Fig. 2 shows voltage time plots or wave forms explanatory of the operation of the circuit shown in Fig. 1.

Referring to the drawing, and more particularly to Fig. 2, the negative gate is shown at *a*, and controls the production of current oscillations shown at *b*. This represents the current in the inductance. The corresponding voltage oscillations across the inductance are shown at *c*. One such use for such a discontinuous train of oscillations is to produce a marker wave on the oscilloscope of a pulse-echo system for indicating range. For this purpose the oscillations of *c* may be clipped as shown at *d*, limited and squared as shown at *e*, and differentiated as shown at *f*; the resulting peaks being suitable for use as a timing wave when applied to the vertically deflecting plates of the oscilloscope. It will be noticed that the first pip corresponds to zero range.

Figure 1:
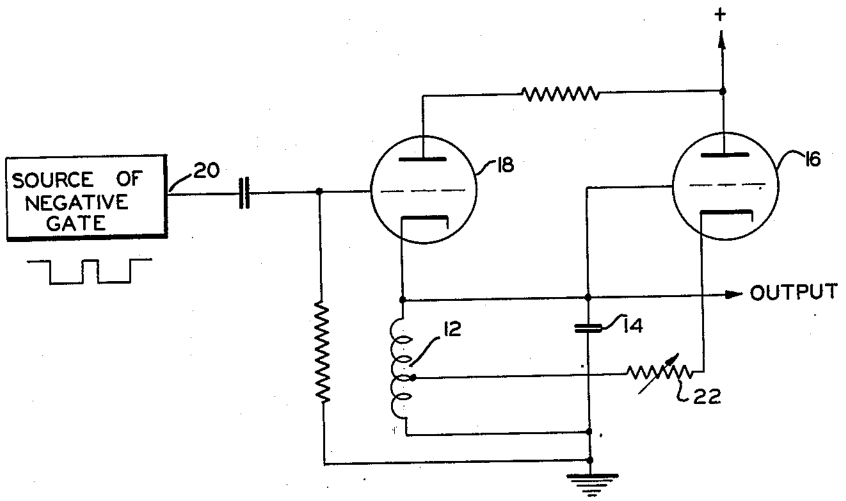
Fig. 1 is a circuit diagram explanatory of the invention.

Referring now to Fig. 1, the sine wave is generated in a tank circuit made up of an inductor 12 and a capacitor 14. A switch tube 18 is shunted across the tank circuit, and a source of negative gate is supplied at 20 to the control electrode of the switch tube. The circuit so far described would be a plain ringing circuit.

Such a circuit starts with a good sinusoidal wave form, even on the first cycle. In the quiescent condition a constant current flows through the switch tube. When the switch tube is opened the current decreases sinusoidally, as indicated at *b* in Fig. 2. Because the voltage across a parallel tuned circuit lags the current by 90°, the voltage starts from zero when the switch is opened (assuming that the inductance has negligible resistance). This is shown at *c* in Fig. 2. When the output is squared and differentiated the pips occur at the current maxima or voltage minima. Thus there is no lag between the start of the gate and the production of the first pip.

However, the output of a simple ringing circuit decays exponentially because of damping caused by the resistance associated with the tuned circuit. In accordance with the present invention, a negative resistance device is added across the tuned circuit, and its value is so chosen as to be just equal to the positive resistance which causes the oscillation to decay. The result is that the oscillations maintain a constant amplitude throughout the time in which the switch tube is gated off. This constant amplitude is clearly shown in Fig. 2. When the current again flows through the switch tube a positive resistance is in effect shunted across the tuned circuit, causing the oscillations to stop.

In the present case the negative resistance device consists of a vacuum tube 16 (Fig. 1), used in the form of a Hartley oscillator, but with a very limited amount of feed back. Considering the circuit more specifically, the tube 16 preferably has its control electrode connected to one side of the tank circuit, its anode connected to a B supply, not shown, and thence to ground and so to the opposite side of the tank circuit, and its cathode connected to a bias resistor 22 and thence to an intermediate point on the inductor 12 of the tank circuit.

It will be noted that the tank is located in the cathode circuit of the tube 16. Because tube 16 is connected as a cathode follower there is no gain, and in fact a slight loss of potential. By connecting the cathode to an intermediate point on inductor 12 the inductor functions as an auto-transformer, thereby supplying a greater potential from the upper end of the inductor to the grid of the tube. If the tap on the inductor is moved in one direction, the oscillations will tend to decay, and if moved in the opposite direction the oscillations will tend to grow, but at a proper intermediate point the oscillations will remain substantially constant. I have found it more convenient to insert a variable resistor 22 in the cathode lead as a means for controlling the feed back and thus maintaining the oscillations substantially constant in amplitude. The feed back is far less than would be provided in an ordinary oscillator, the output of which usually builds up gradually to a constant value determined by some limiting factor, such as an RC circuit biasing the grid. In the present case the limiting factor is the small degree of feed back.

The tank circuit 12, 14 is connected in the cathode lead of the switch tube 18, and it will be understood that the damping imposed by the switch tube when the tube is conductive prevents oscillation until the negative gate is applied, whereupon the tube 18 is made non-conductive and the oscillator is set into oscillation by the effect of the interruption of the current flowing through the inductor 12. In fact, the amplitude of the switch current is preferably about equal to the desired peak amplitude of oscillation, so that the first oscillation is of full amplitude.

It is believed that the construction and operation of my improved circuit, as well as the advantages thereof, will be apparent from the foregoing description. The tank circuit has a sine wave output which is suitable for phase control or other purposes for which a sine wave is desirable. No appreciable time is required to build up to full amplitude oscillation. There is no lag between the start of the gate and the production of the first pip. The oscillator tube may be changed to another having slightly different inter-electrode capacitance, without changing the frequency of oscillation of the oscillator, because the grid circuit of the tube does not draw any grid current and therefore does not load the tank circuit.

It will be understood that while I have shown and described my invention in a preferred form, changes may be made in the circuit disclosed without departing from the spirit of the invention, as sought to be defined in the following claims.

I claim:

1. A circuit comprising an electron tube having a cathode, a control grid and an anode, coupled to a tank circuit located in the cathode circuit of said tube, said control grid being connected to one side of said tank circuit, said anode being connected to a power supply and thence to the opposite and grounded side of said tank circuit, said cathode being connected to an intermediate point on the inductor of said tank circuit whereby said inductor acts as an auto-transformer to supply an increased potential to said grid sufficient for a limited amount of feedback, a switch tube having a cathode, a control grid and an anode, said switch tube being shunted across said tank circuit with said tank circuit connected in the cathode circuit of said switch tube, said cathode being connected to one side of said tank circuit, said switch tube control grid being connected resistively to the opposite and grounded side of said tank circuit, and a source of timed negative voltage pulses connected to said switch tube control grid to control the intervals of oscillation of said tank circuit.

2. In a radio pulse echo system, a circuit for producing a periodically discontinuous train of oscillations, said circuit comprising an electron emission tube having a cathode, a control grid and an anode, coupled to a tank circuit located in the cathode circuit of said tube, said control grid being connected to one side of said tank circuit, said anode being connected to a power supply and thence to the opposite and grounded side of said tank circuit, said cathode being connected to an intermediate point on the inductor of said tank circuit, whereby said inductor acts as an auto-transformer to supply an increased potential to said control grid sufficient for a limited amount of feedback, a variable resistor being connected in series between said cathode and said inductor in order to adjust the amount of feedback to maintain the oscillations at constant amplitude, a switch tube having a cathode, a control grid, and an anode, said switch tube being shunted across said tank circuit with said tank circuit connected in the cathode circuit of said switch tube, said switch tube cathode being connected to one side of said tank circuit, said switch tube control grid being connected through a resistor by the opposite and grounded side of said tank circuit, and a source of timed negative voltage pulses connected to said switch tube control grid to control the intervals of oscillation of said tank circuit.

3. A circuit comprising an electron tube having a cathode, a control grid and an anode, coupled to a tank circuit located in the cathode circuit of said tube, said control grid being connected to one side of said tank circuit, said anode being connected to a power supply and thence to the opposite and grounded side of said tank circuit, said cathode being connected to an intermediate point on the inductor of said tank circuit whereby said inductor acts as an auto-transformer to supply an increased potential to said grid sufficient for a limited amount of feedback, a switch tube having a cathode, a control grid, and an anode, said switch tube being shunted across said tank circuit with said tank circuit connected in the cathode circuit of said switch tube, said cathode being connected to one side of said tank circuit, said switch tube control grid being connected resistively to the opposite and grounded side of said tank circuit, a source of timed negative voltage pulses connected to said switch tube control grid to control the intervals of oscillation of said tank circuit, and means to vary the amount of feedback energy to maintain the oscillations at substantially constant amplitude.

4. A circuit for producing a train of oscillations of constant amplitude comprising a resonant loop circuit having losses, a source of electrical energy, switching means for periodically connecting and disconnecting for predetermined intervals of time said loop and said source, an electron tube having a cathode, a control grid and an anode, said tubing being connected as a cathode follower, means to couple energy from said loop to said control grid, and means to feed back energy from said cathode connections to said loop to supply said loop circuit losses, said means including an adjustable resistor to vary the amount of feed back energy to maintain the oscillations at substantially constant amplitude.

5. A circuit for producing a train of oscillations of constant amplitude comprising a resonant loop circuit having losses, means to excite said loop to produce oscillations, a source of timed voltage pulses, said means being responsive to pulses from said source to damp said oscillations for predetermined intervals of time, an electron tube having a cathode, a control grid and an anode, said tube being connected as a cathode follower, means to couple said control grid to said loop, and means to feed back energy from said cathode connections to said loop to equal said loop circuit losses, whereby said oscillations remain substantially constant in amplitude.

6. A circuit for generating a train of oscillations of constant amplitude comprising a source of electrical energy, a source of timed voltage pulses, an oscillatory circuit containing inductance, capacitance, and resistance, means connecting said circuit to said energy source including a switch tube having a cathode, a control grid and an anode, said switch tube being adapted to control the current flow from said energy source to said oscillatory circuit, means applying voltage pulses from said source to said control grid to interrupt suddenly said current flow to initiate oscillations in said oscillatory circuit for a predetermined interval of time, an electron tube having a cathode, a control grid and an anode, said electron tube being connected as a cathode follower, means to couple said control grid of said electron tube to said oscillatory circuit, and means to feed back energy from said electron tube cathode connections to said oscillatory circuit to supply energy dissipated in said resistance of said oscillatory circuit.

EDWARD F. MACNICHOL, JR.

References Cited in the file of this patent

UNITED STATES PATENTS

| Number | Name | Date |
|---|---|---|
| 2,273,193 | Heising | Feb. 17, 1942 |
| 2,386,844 | Davis | Oct. 6, 1945 |
| 2,417,834 | Lord | Mar. 25, 1947 |

OTHER REFERENCES

Sherman: The Generation for Television of Horizontal Synchronizing Pulses from Vertical Pulses by Means of Impulse Excitation; reprint from Proc. I. R. E., vol. 28, No. 9, September 1940, 250-36-13.2, pages 407-8.

Terman: Radio Engineering, McGraw-Hill Publishing Co., 2nd edition, 1937, page 369.